H. A. Alden.
Hose.
No. 28,231. Patented May 8, 1860.
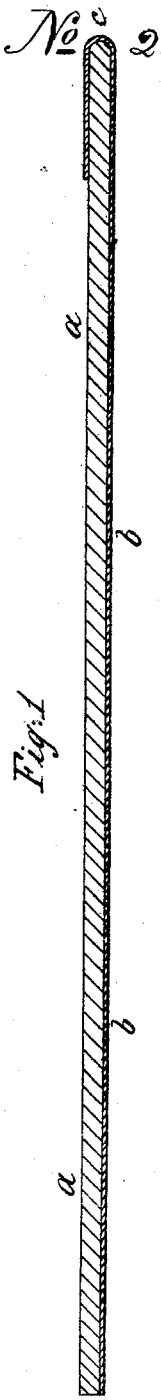
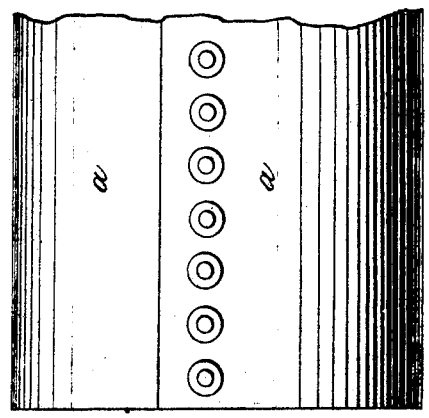
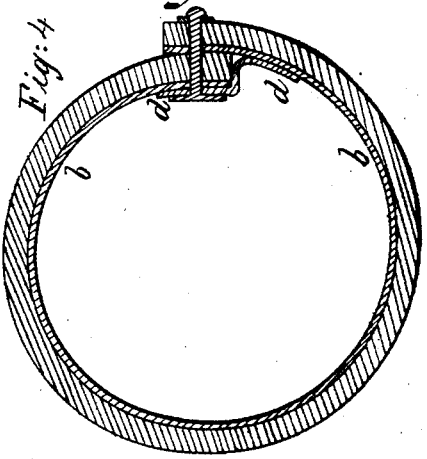
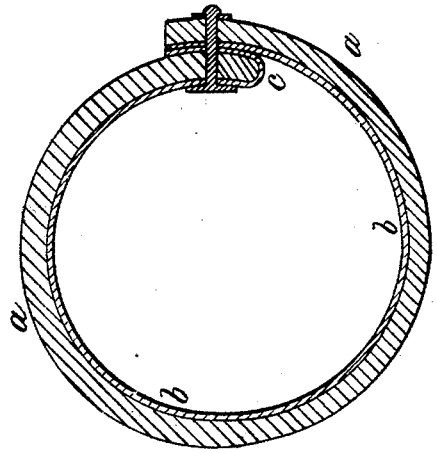
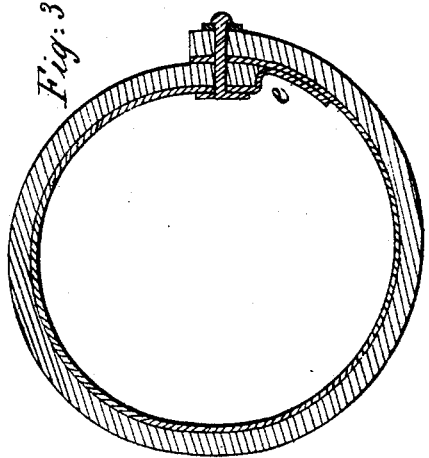
Witnesses
A. Pohlers
W. Fairfax
Inventor
Henry A. Alden
A. Pollak

UNITED STATES PATENT OFFICE.

HENRY A. ALDEN, OF MATTEAWAN, NEW YORK, ASSIGNOR TO NEW YORK RUBBER COMPANY.

HOSE-TUBING.

Specification of Letters Patent No. 28,231, dated May 8, 1860.

*To all whom it may concern:*

Be it known that I, HENRY A. ALDEN, of Matteawan, in the county of Dutchess and State of New York, have invented a certain new and useful Improvement on Flexible Tubing or Hose for Conveying Fluids; and I do hereby declare that the following, taken in connection with the accompanying drawing, forms a full and clear description thereof, so that others may make and use the same, and wherein is set forth the nature and principle of my invention by which it may be distinguished from others of a similar class, together with what I claim and desire to secure by Letters Patent.

Numerous attempts have been made to manufacture durable and efficient flexible hose for the conveyance of fluids from other material than leather, applicable to fire engine and other purposes. Leather is and has long been so costly that every improvement which has for its object the production of flexible tubing or hose of cheaper yet durable material is important. Increased lightness and strength are also important considerations, and hose for the conveyance of fluids should present a smooth interior surface to reduce friction of the fluid in passing through it and must be proof against mildew likewise, be capable of being spliced, patched or repaired with facility and despatch when broken. My improvement, while it relates to a hose considerably cheaper than those made from leather, effects all these desiderata which neither india rubber nor the Grenoble hemp hose do.

To explain more particularly the character and value of my improvement, I would here refer to the hose patented as a new article of manufacture to John C. Boyd, in August 1859. Such hose was made of a thick and strong woven fabric of cotton, hemp, or other fibrous material which while in the piece or sheet, had fastened to it on one of its sides or faces by rubber cement a sheet of india rubber or gutta percha and the whole was then passed through calender rolls to make tight the rubber sheet with the woven fabric and to give a smooth finish to the whole. Such lined or rubber faced sheet or piece if wider than necessary to form hose was then cut into strips of the required width and the hose formed of any desired diameter by making of the sheet or strip a tube with the water proof lining or facing turned or arranged inside and the edges of the tube riveted together in the usual manner of fastening leather hose. This construction of flexible pipe or hose however is very defective inasmuch as the inner exposed edge of the tube presented a surface of fibrous material uncovered by lining or coating impervious to water, and allowing by capillary attraction of the absorption of the fluid inside the hose to and amongst the fibers forming the body or woven portion of the hose, which not only operated to rot the hose at its longitudinal lap or joint and to produce mildew, but also made the hose leaky, heavy by absorption of moisture from the fluid inside and difficult to dry as the evil was a constantly accruing one from the interior. All of these defects in the character of hose, I have just described, my improvement obviates, while it possesses all the advantages of a light flexible tight, cheap and durable hose.

I make my hose also of a woven fabric of cotton, hemp or other suitable fibrous material having its one side or face coated or lined with india rubber sheet, gutta percha or their compounds, with or without sulphur, much in the same or any suitable manner, the water proof lining being on the inside of the tube and the hose riveted together at its edges or lap; but I do away with the objections just named to such character of hose and produce a more perfect and durable longitudinal lap or joint by so constructing the hose as that the woven fabric shall not present an exposed or uncovered edge on the inside for the action of capillary attraction and whereby the hose may be made perfectly water tight on its inside. This may be done by making the india rubber or gutta percha sheet somewhat wider than the woven fabric so as to admit the rubber being turned over one or both edges of the fabric and on the outside surface thereof, for the width of the longitudinal lap or thereabout, of the hose and fastened thereto, as represented in Figure 1 of the accompanying drawing which illustrates an end view of a woven sheet or strip so covered and before it is formed into a tube as represented in Fig. 2; (*a a*,) in such figures indicating the woven fabric; (*b, b,*) the india rubber sheet or its equivalent; and (c), the edge overlapping portion of the rubber. Or, the same effect may be produced and in substantially the same manner by uniting the edge covering portion (c) of the rubber with the inside of the tube as represented in Fig. 3 and which may be done by leaving the overlapping edge portion of the rubber lining loose and securing it on the inside of the tube so as to cover the inner edge of the lap after the tube is shaped and riveted or while it is being closed. Or a separate piece of water proof lining (d) may be applied as in Fig. 4 to the inside of the hose so as to cover its inner edge, the separate piece or strip (d) of rubber being easily made to adhere with the rubber sheet or lining (b b) of the hose.

I claim therefore as new and useful improvement—

In a hose or flexible pipe or tube formed of woven fabric with a water proof lining substantially as specified, covering the inner edge of the tube at its longitudinal lap or joint with a water proof lapping strip essentially as and for the purposes herein set forth.

In testimony whereof I have signed my name to this specification before two subscribing witnesses.

HENRY A. ALDEN.

Witnesses:
BENJ. F. LEE,
W. H. GERARI.